United States Patent Office 2,981,746
Patented Apr. 25, 1961

2,981,746
FLUORO SUBSTITUTED POLYSILOXANES AND PREPARATION THEREOF

Murray S. Cohen, Morristown, and Daniel Grafstein, Dover, N.J., assignors to Thiokol Chemical Corporation, Trenton, N.J., a corporation of Delaware No Drawing. Filed May 29, 1958, Ser. No. 738,620

6 Claims. (Cl. 260—448.2)

This invention relates to novel liquid polymers, in the form of polyorganofluorosiloxanes, and to methods of preparing them.

A principal object of this invention is to provide novel polyorganofluorosiloxanes in the form of liquid polymers, which are useful as hydraulic fluids, heat transfer media, instrument lubricants, and flotation fluids for gyroscopes and other instruments of this type.

Another principal object is to provide novel methods of preparing said polyorganofluorosiloxanes from one or more substituted silanes as principal starting materials; these methods including hydrolytic polymerization, co-hydrolytic copolymerization, and catalyzed condensation.

Another object is to provide novel polyorganofluorosiloxanes which possess desirable densities, thermal stabilities, and viscosities.

Another object is to provide novel polyorganofluorosiloxanes which are or are not end-blocked or chain-stoppered, as desired.

Other objects and advantages of this invention will appear as the description thereof proceeds.

The methods employed in determining physical and chemical constants of our novel polymers are described at this point.

*Molecular weight.*—All molecular weight determinations were made by the cryoscopic method in benzene.

*Viscosity.*—Measurements of viscosity were made at various temperatures up to 400° F. A Cannon-Manning semimicro viscometer was used in these studies. When the instrument was filled and placed in a bath maintained at a predetermined temperature, approximately 8 minutes were allowed for the liquid under test to come to thermal equilibrium.

In the examples below viscosity values are given in centistokes (cs.).

*Viscosity index (V.I.).*—Viscosity indices were calculated from the "ASTM Viscosity Tables" (ASTM Special Technical Publication No. 43A, 1953), in the usual manner.

*ASTM slopes.*—The data obtained in the viscosity tests were plotted on ASTM Standard Viscosity-Temperature Charts (ASTM designation: P341–343). ASTM slopes were taken directly from the viscosity-temperature curves so plotted.

Measurements of density and of refractive index were made by conventional methods.

Various fluorinated substitution products of silane ($SiH_4$) provide the chief starting materials or monomers for preparing our novel polyorganofluorosiloxanes. Examples of such fluorinated starting materials are (a) alkyl- or aryl-dichlorofluorosilanes—including methyldichlorofluorosilane ($CH_3SiCl_2F$) and phenyldichlorofluorosilane ($C_6H_5SiCl_2F$); (b) alkylarylchlorofluorosilanes, such as phenylmethylchlorofluorosilane ($C_6H_5CH_3SiClF$); and (c) alkarylalkoxyfluorosilanes—an example being phenylmethylethoxyfluorosilane ($C_6H_5CH_3SiOC_2H_5F$).

We do not employ as a chief starting monomer a substituted silane containing more than one fluoro group on silicon; for our researches have indicated that when more than one fluoro group is attached to the same silicon atom, all but one would be hydrolytically removed. The fluoro group of a monofluorosilane is not readily removed by hydrolysis. The monofluoro materials of groups (b) and (c) above consequently may act as end-blocking or chain-stopping reagents, as disclosed in Examples V, VI, and XI below.

Another representative end-blocking or chain-stopping reagent, which we have employed in effecting polymerization of the foregoing fluorinated starting materials, is trimethylchlorosilane ($(CH_3)_3SiCl$).

Methods of preparing certain of the foregoing fluorinated silanes, for use as monomers or comonomers, and as chain-terminating agents, are described and claimed in the pending application of Murray S. Cohen and Joseph Green, Serial No. 619,945, filed November 2, 1956, now U.S. Patent No. 2,927,938.

We have prepared representative embodiments of our novel polyorganofluorosiloxanes by the use of substantially different methods, including (a) hydrolytic polymerization, (b) cohydrolytic copolymerization, and (c) condensation of a silicon ester with an organosilicon halide.

The first two of the foregoing methods may be carried out with the starting materials in solution, as in benzene, or in the absence of such a solvent; and an end-blocking agent may or may not be involved.

*Benzene as solvent.*—Weighed quantities of starting materials, of the order of 0.1 mole each, are dissolved in 30 cc. of benzene. The solution, in a 100 ml. round-bottom flask, is chilled with crushed ice. To the cold solution 25 ml. of water are added slowly with vigorous stirring. After subsidence of the initial exothermic reaction and evolution of gaseous hydrogen chloride, the mixture is stirred for about 2 hours at room temperature, and then is refluxed for 4 hours. After cooling, the benzene solution is washed with 1 percent aqueous sodium carbonate and then with water. The benzene layer is separated and dried for about 16 hours over 5 grams of anhydrous magnesium sulfate. After filtration the benzene solvent is distilled off, and other volatiles are removed by heating the residual oil to 240° to 280° C. for 10 minutes at a pressure of 5 mm. or less.

*No solvent.*—A mixture of weighed quantities of starting materials is added drop-by-drop, with vigorous stirring, to 100 ml. of water containing 2 drops of sulfuric acid. (Hereinafter this mixture of water and sulfuric acid ordinarily will be designated as dilute sulfuric acid.) The acidulated, aqueous mixture is heated for 4 hours at 70° to 80° C. The liquid reaction product is separated, and volatile materials are removed by heating at 240° to 245° C. for about 10 minutes at 5 mm. pressure or less. The residual liquid consists essentially of an organofluorosiloxane polymer.

The use, in general, of the aforedescribed method of preparing a polyorganofluorosiloxane, employing benzene as a solvent, is illustrated in Examples I to VI, inclusive. Otherwise, the respective disclosures in these examples are limited to facts and data that are particular thereto.

*Example I*

The reactants, dissolved in benzene, were 19.5 grams (0.1 mole) of phenyldichlorofluorosilane and 7.2 grams (0.066 mole) of trimethylchlorosilane. The residual polymer was a liquid, weighing 11.8 grams. Its properties, as measured, were:

Molecular weight _____ 898
Viscosity (cs.) at:
   32° F. _____ 1966
   77° F. _____ 176
   100° F. _____ 91
   210° F. _____ 16
Viscosity index _____ 146
ASTM slope _____ 0.53

We have assigned a formula to each of the organofluorosiloxane polymers disclosed in our several examples. Bearing in mind the general view that a synthetic polymer is not strictly a chemical individual, we believe that each of the new polymer formulas assigned by us presents with sufficient accuracy to those skilled in the calling the chemical constitution of the corresponding product. The essential bases for our belief just stated are (1) the known formulas of the several reactants involved in the preparation of our novel polymers, and (2) the close conformity of the calculated value to the observed value of the molecular weight of each polymer.

The formula for the polymer of Example I is

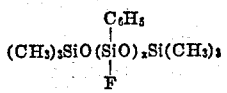

where $x$ represents the number of recurring units. When $x$ is taken as 5 in this formula, the calculated molecular weight of the polymer is 863.4, or 96.1 percent of the observed value of 898.

Example II

The reactants, dissolved in benzene, were 19.6 grams (0.1 mole) of phenyldichlorofluorosilane and 5.4 grams (0.05 mole) of trimethylchlorosilane. The residual liquid polymer weighed 12 grams. Observed data thereon were:

Molecular weight _____ 1116
Viscosity (cs.) at:
   77° F. _____ 461.8
   100° F. _____ 219.8
   210° F. _____ 26.4
Viscosity index _____ 161
ASTM slope _____ 0.54

Except for the value assigned to $x$, the formula of this polymer is the same as that in Example I. When $x=7$, its calculated molecular weight is 1143.8, or 102.5 percent of the observed value of 1116.

Example III

The reactants, dissolved in benzene, were 19.5 grams (0.1 mole) of phenyldichlorofluorosilane, 10.8 grams (0.1 mole) of trimethylchlorosilane, and 13.3 grams (0.1 mole) of methyldichlorofluorosilane. The yield of residual liquid was 15.2 grams. Observed data thereon were:

Molecular weight _____ 1051
Viscosity (cs.) at:
   77° F. _____ 55
   100° F. _____ 35
   210° F. _____ 8.6
Viscosity index _____ 168
ASTM slope _____ 0.52
Refractive index _____ 1.4620

The formula of this copolymer is

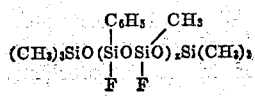

When $x=4$, its calculated molecular weight is 1035.6, or 98.5 percent of the observed value of 1051.

Example IV

A quantity of phenyldichlorofluorosilane—25.4 grams (0.13 mole)—dissolved in benzene, was hydrolyzed in the absence of any end-blocking or other molecular-weight-controlling reagent. The product, consisting of 15.0 grams of a highly mobile liquid, did not yield any volatile fraction when heated at 240° to 257° C. for 10 minutes at 10 mm. pressure. Observed measurements thereon were:

Molecular weight _____ 1300
Viscosity (cs.) at:
   100° F. _____ 451
   210° F. _____ 44
Viscosity index _____ 150
ASTM slope _____ 0.53

The formula of this polymer is

When $x=9$, its calculated molecular weight is 1261.8, or 97.1 percent of the observed value of 1300.

Example V

The reactants, dissolved in benzene, were 19.5 grams (0.1 mole) of phenyldichlorofluorosilane, and 17.5 grams (0.1 mole) of phenylmethylchlorofluorosilane; the latter probably acting as a monofunctional end-blocking agent. Observed measurements on the residual polymer were:

Molecular weight _____ 894
Viscosity (cs.) at:
   32° F. _____ 688
   100° F. _____ 62.6
   210° F. _____ 10.7
   400° F. _____ 2.9
Viscosity index _____ 143
ASTM slope _____ 0.60
Refractive index _____ 1.5222
Density _____ 1.2437

The formula of this polymer is

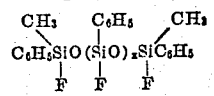

When $x=4$, its calculated molecular weight is 855.2, or 95.7 percent of the observed value of 894.

Example VI

The reactants, dissolved in benzene, were 164 grams (0.84 mole) of phenyldichlorofluorosilane and 97.8 grams (0.56 mole) of phenylmethylchlorofluorosilane; the latter, as in Example V, probably acting as a monofunctional end-blocking agent. Observed measurements on the residual polymer were:

Molecular weight _____ 757
Viscosity (cs.) at:
   100° F. _____ 142
   210° F. _____ 19.9
Viscosity index _____ 135
ASTM slope _____ 0.55
Refractive index _____ 1.5240
Density _____ 1.2654

Except for the value assigned to $x$, the formula of this polymer is the same as that in Example V. When $x=3$, its calculated molecular weight is 715, or 94.5 percent of the observed value of 757.

In a paragraph above, captioned "No Solvent," we have described a method of preparing a polyorganofluorosiloxane, wherein hydrolytic polymerization is effected by dilute sulfuric acid. The use, in general, of this method is illustrated in Examples VII to X, inclusive. Otherwise, the respective disclosures in these examples are limited to facts and data particular thereto.

*Example VII*

The reactants—in dilute sulfuric acid—were 6.7 grams (0.05 mole) of methyldichlorofluorosilane, 9.8 grams (0.05 mole) of phenyldichlorofluorosilane, and 10.9 grams (0.1 mole) of trimethylchlorosilane. The observed molecular weight of the product was 1850; and its viscosity at 77° F. was 274 centistokes.

Except for the value assigned to $x$, the formula of this copolymer is the same as that given in Example III. When $x=8$, its calculated molecular weight is 1908.8, or 103.2 percent of the observed value of 1850.

*Example VIII*

The reactants—in dilute sulfuric acid—were 13.3 grams (0.1 mole) of methyldichlorofluorosilane and 10.9 grams (0.1 mole) of trimethylchlorosilane. The observed molecular weight of the product was 1575. Its formula is $$(CH_3)_3SiO(\underset{F}{\underset{|}{\overset{CH_3}{\overset{|}{Si}}}}O)_xSi(CH_3)_3$$

When $x=18$, its calculated molecular weight is 1568.2, or 99.5 percent of the observed value of 1575.

*Example IX*

The reactants—in dilute sulfuric acid—and their respective quantities were the same as those in Example VIII. A light yellow oil of low viscosity was obtained. Its observed molecular weight was 1704. Its formula, except for the value assigned to $x$, is the same as that in Example VIII. When $x=20$, its calculated molecular weight is 1724.4, or 101.2 percent of the observed value of 1704.

*Example X*

The reactants—in dilute sulfuric acid—were 19.5 grams (0.1 mole) of phenyldichlorofluorosilane, and 10.9 grams (0.1 mole) of trimethylchlorosilane. The observed molecular weight of the product was 1060. Its viscosity (cs.) at 32° F. was 1966, and at 77° F. was 297. Its formula, except for the value of $x$, is the same as that in Example I. When $x=6$, its calculated molecular weight is 1003.6, or 94.7 percent of the observed value of 1060.

The formation of one of our novel polymers by condensing a silicon ester with an organosilicon halide is illustrated in Example XI.

*Example XI*

Ferric chloride (0.4 gram) was added to 24.5 grams (0.13 mole) of phenylmethylfluoroethoxysilane and 16.5 grams (0.065 mole) of diphenyldichlorosilane. Ethyl chloride was evolved as the reaction mixture was heated slowly to 200° C. After cooling, the residue was dissolved in benzene, and washed successively with water, with 1 percent aqueous sodium carbonate, and then with water. The solution was dried once over anhydrous magnesium sulfate. After filtration, the solvent was distilled off, and the remaining volatiles were removed by heating to 240° C. at 6 mm. for 10 minutes. The residual liquid weighed 20.6 grams. Observed measurements thereon were:

| | |
|---|---|
| Molecular weight | 582 |
| Viscosity (cs.) at: | |
| 77° F | 91.4 |
| 100° F | 46.5 |
| 210° F | 7.6 |
| Viscosity index | 130 |
| Refractive index | 1.5493 |
| Density | 1.159 |

The formula of this copolymer is $$H_3C\underset{F}{\underset{|}{\overset{C_6H_5}{\overset{|}{Si}}}}O-\left(\underset{C_6H_5}{\underset{|}{\overset{C_6H_5}{\overset{|}{Si}}}}O\right)_x-\underset{F}{\underset{|}{\overset{C_6H_5}{\overset{|}{Si}}}}CH_3$$

The observed molecular weight of 582 indicates that an almost equimolar mixture of products having $X=1$ (M.W.=492) and $X=2$ (M.W.=690) was produced (M.W. of equimolar mixture=591).

The aforestated objects of our invention are achieved by the various novel polymeric products disclosed in the foregoing examples; such products being prepared by the methods described herein. Some of the uses of these polymers are as hydraulic fluids, heat transfer media, instrument lubricants, and flotation fluids for gyroscopes and other instruments of that type.

It is to be understood that modifications and changes in detail in the aforedescribed means and method steps may be made without departing from the spirit of our invention; and that all exemplifications and variants of our novel methods and of the new products thereof, set forth hereinabove, are intended to be illustrative only, and in no sense limitative of the invention other than as the same is defined in the accompanying claims.

We claim:

1. A low molecular weight liquid polyorganosiloxane polymer having a recurrent structural unit of the formula $$-\underset{F}{\underset{|}{\overset{R_1}{\overset{|}{Si}}}}O-$$

and chain terminating groups of the formula $R_2R_3FSi-$, linked to the polymer chain by oxygen atoms, wherein $R_1$, $R_2$, and $R_3$ are members of the class consisting of alkyl groups and aryl groups.

2. A polymer as claimed in claim 1 in which $R_1$ is methyl and $R_2$ and $R_3$ are respectively phenyl and methyl.

3. A polymer as claimed in claim 1, in which $R_1$ is phenyl and $R_2$ and $R_3$ are respectively phenyl and methyl.

4. A method of preparing liquid polyorganosiloxane polymers having terminal fluoro groups which comprises condensing a monomer of the formula $R_1FSiX_2$ in the presence of a chain terminating member of the formula $R_2R_3FSiY$ and ferric chloride as a catalyst, where $R_1$, $R_2$ and $R_3$ are members of the class consisting of alkyl groups and aryl groups, X is chlorine, and Y is an alkoxy group.

5. A method of preparing liquid polyorganosiloxane polymers having terminal fluoro groups which comprises hydrolyzing a monomer of the formula $$R_1FSiX_2$$

in the presence of a chain terminating member of the formula $$R_2R_3FSiY$$

wherein $R_1$, $R_2$, and $R_3$ are members of the class consisting of alkyl groups and aryl groups, X is chlorine, and Y is a member of the class consisting of chlorine and alkoxy groups.

6. In the method of preparing a polyorganosiloxane, the steps which comprise forming a mixture of weighed quantities of (a) a monomer of the class consisting of methyldichlorofluorosilane and phenyldichlorofluorosilane and (b) an end-blocking agent consisting of phenylmethylchlorofluorosilane, adding said mixture drop-wise, with vigorous stirring, to dilute sulfuric acid, and heating the acidulated mixture for about 4 hours at 70° to 80° C.

References Cited in the file of this patent

UNITED STATES PATENTS

| | | |
|---|---|---|
| 2,381,366 | Patnode | Aug. 7, 1945 |
| 2,469,888 | Patnode | May 10, 1949 |

(Other references on following page)

UNITED STATES PATENTS

| | | |
|---|---|---|
| 2,485,928 | Servais | Oct. 25, 1949 |
| 2,695,307 | Guillissen et al. | Nov. 23, 1954 |

FOREIGN PATENTS

| | | |
|---|---|---|
| 202,513 | Australia | June 13, 1956 |
| 534,818 | Canada | Dec. 25, 1956 |
| 1,030,346 | Germany | May 22, 1958 |

OTHER REFERENCES

Sokolov et al.: "Izvestia Akad. Nauk SSSR, Otdel, Khim. Nauk.," 1957, pages 806–811 (52 Chemical Abstracts 3668).